United States Patent [19]
Pons et al.

[11] Patent Number: 5,805,670
[45] Date of Patent: Sep. 8, 1998

[54] PRIVATE NOTIFICATION SYSTEM FOR COMMUNICATING 9-1-1 INFORMATION

[75] Inventors: Robert M. Pons; Jay T. Snider, both of Wynnewood, Pa.

[73] Assignee: Life Safety Solutions, Inc., King of Prussia, Pa.

[21] Appl. No.: 620,726

[22] Filed: Mar. 19, 1996

[51] Int. Cl.$^6$ .................................................. H04M 11/04
[52] U.S. Cl. ................................................ 379/45; 379/37
[58] Field of Search ................................ 379/37, 38, 45, 379/49, 90, 90.01, 92.03, 92.04

[56] References Cited

U.S. PATENT DOCUMENTS

| | | | |
|---|---|---|---|
| 5,195,126 | 3/1993 | Carrier et al. | 379/45 |
| 5,249,223 | 9/1993 | Vanacore | 379/45 |
| 5,311,569 | 5/1994 | Brozovich et al. | 379/45 |
| 5,334,974 | 8/1994 | Simms et al. | 340/990 |
| 5,379,337 | 1/1995 | Castillo et al. | 379/49 |
| 5,388,147 | 2/1995 | Grimes | 379/59 |
| 5,444,760 | 8/1995 | Russ | 379/37 |

OTHER PUBLICATIONS

"Dial 911 For Profits", Sound & Communications Paul Ruggieri, May 1984.

Prospectus of MER Telemanagement Solutions Ltd. dated Feb. 18, 1997, p. 30.

*Primary Examiner*—Curtis A. Kuntz
*Assistant Examiner*—Stephen W. Palan
*Attorney, Agent, or Firm*—Seidel, Gonda, Lavorgna & Monaco, PC

[57] ABSTRACT

A private notification system designed to communicate 9-1-1 information to preselected recipients, such as family and friends, identified by a subscriber to the system. The system includes a communications bridge receiving identifying information about a person placing a 9-1-1 call, a private command control center receiving the identifying information from the communications bridge, and a notification database accessible by the command control center to provide subscriber data corresponding to the identifying information. One embodiment of the system operates in conjunction with a public safety access point.

23 Claims, 3 Drawing Sheets

PRIVATE NOTIFICATION SYSTEM FOR COMMUNICATING 9-1-1 INFORMATION

FIELD OF THE INVENTION

This invention relates to a private notification system designed to communicate 9-1-1 information to a predetermined list of individuals (such as close family and friends) selected by a subscriber to the system. The system includes a private Command Control Center ("CCC"), a communications bridge, and a notification database. One embodiment of the system works in conjunction with a Public Safety Answering Point ("PSAP") which receives the emergency calls ("9-1-1 call") and a PSAP notification bridge. Another embodiment of the system includes an emergency care information database, a Computer Aided Dispatch ("CAD") bridge, and an emergency field unit bridge. That embodiment of the system communicates emergency care information to public emergency care personnel serving the subscriber.

BACKGROUND OF THE INVENTION

Private notification systems to communicate information to public safety officials have been used for many years. Alarm systems of various kinds have been used as part of such notification systems, where the activation of the alarm system is communicated to a private monitoring/dispatch center which, in turn, notifies the public safety officials and at the same time verifies the circumstances of the activation.

Personal security systems which communicate emergency care information to dispatch centers are also known in the art. Typically, such systems include a private command control or dispatch center, a set of alarm or emergency conditions, a communications link, a link to the public emergency authorities, and means for identifying the system subscriber's location and identity. The communications link usually comprises a mobile radio ("wireless") telephone connection which, together with a wired telephone network, serves as the underlying communications framework for such a system. Personal security systems have been described in connection with a vehicle (see, e.g., U.S. Pat. No. 5,334,947).

There is more to private notification systems, however, than simply communicating the alarm conditions regarding one's home or vehicle. Close family and friends of a person placing a 9-1-1 call or for whose emergency such call is being placed ("the 9-1-1 caller") increasingly seek notification about the emergency as soon it develops. Such notification might be vital. By way of example, parents of children who are being cared for by a baby sitter might wish to be notified if someone calls 9-1-1 from their house when they are away. By way of another example, if the 9-1-1 caller is incapacitated and thus unable to provide important medical information (such as his or her medical history) to emergency care personnel, close family and friends could provide such information. Vital medical information covers any medical condition ranging from, by way of example, diabetes to an allergic reaction to penicillin. Close family and friends might also seek notification so as to provide immediate personal support to the emergency caller by visiting with him or her in an emergency room or a hospital where he or she is admitted.

In addition to subscribers' medical information, the provision of information important to police and fire personnel might also be vital. Thus, fire and police personnel might need to know the number of entrances to the house at the site of the emergency. They might also need to know whether there are children in the house and, if so, in which rooms they sleep. The police might need to be aware of whether the home owners have pets. The fire engine en route to the scene of the emergency might need to have the benefit of the blue prints of the house or a building at the scene or might need to be aware of the presence of any hazardous waste in the case of a commercial subscriber.

The notification of public emergency care personnel serving the 9-1-1 caller must conserve time. When public emergency care personnel arrive at the scene of the emergency, they are required to obtain the personal medical or other emergency care information, such as the details of any pre-existing medical problems which might affect the required treatment. Such emergency care information is typically obtained through questioning the 9-1-1 caller or his or her close family and friends. The questioning invariably takes up valuable time which can be better used for making decisions relating to the emergency, such as whether to immediately transport the 9-1-1 caller to a hospital. If neither the 9-1-1 caller nor any close family member or friend is available or able to provide the required medical or other emergency care information, the 9-1-1 caller might be further endangered by being given medication or treatment which is ill advised in light of the 9-1-1 caller's medical history. The same concerns apply to the police and fire information. A properly timed notification of public emergency care personnel about the 9-1-1 caller's emergency care information should take place before they arrive at the scene of the emergency. Such notification should allow the emergency personnel ample time to prepare for the possible special handling of the emergency and the 9-1-1 caller.

A timely notification of hospital emergency room personnel about the 9-1-1 caller's medical history, together with a notification of the 9-1-1 caller's primary care physician about the emergency, might also be vital. The notification of the emergency room personnel provides not only the benefits of time savings in a critical situation, but it prevents potential harm to the 9-1-1 caller from inappropriate treatment as described above. Similarly, notification of the primary care physician might provide the emergency care personnel with special insights developed by the primary care physician during his or her relationship with the 9-1-1 caller. The notification of the emergency room personnel about the 9-1-1 caller's medical information should take place before the 9-1-1 caller's arrival at a medical treatment facility such as an emergency room or a hospital for treatment, to allow emergency room personnel ample time to prepare for the possible special handling of the 9-1-1 caller.

The ability to notify close family and friends of an emergency in a manner which both furnishes vital emergency care information about the 9-1-1 caller and allows them to provide immediate personal support to the 9-1-1 caller by visiting with him or her in an emergency room or a hospital where he or she is admitted is an unfilled need in the art. Likewise, the ability to timely notify the public emergency care personnel attending the 9-1-1 caller about the 9-1-1 caller's emergency care information in a manner which allows it to be shared with the emergency room personnel and the 9-1-1 caller's primary care physician also remains an unfilled need in the art.

Accordingly, there is a need for a private notification system designed to communicate 9-1-1 information to a predetermined list of family and friends selected by the 9-1-1 caller. Furthermore, there is a need to furnish the 9-1-1 caller's emergency care information to the public emergency care personnel attending the 9-1-1 caller, and then to the emergency room personnel and other emergency care providers of the 9-1-1 caller. The present invention fills those needs.

SUMMARY OF THE INVENTION

The present invention comprises a private CCC, a notification database, and a communications bridge receiving identifying information about a person placing a 9-1-1 call. The system includes the communications bridge receiving the identifying information, the CCC receiving the identifying information from the communications bridge, and the notification database accessible by the command control center to provide subscriber data corresponding to the identifying information.

One embodiment of the system operates in conjunction with a PSAP receiving 9-1-1 calls and a PSAP notification bridge. The PSAP notification bridge is in communication with the PSAP which obtains identifying information such as a telephone number of a person placing the 9-1-1 call from the PSAP receiving the 9-1-1 call. The communications bridge is in communication with the PSAP notification bridge which obtains the identifying information from the PSAP notification bridge. The CCC is in communication with the communications bridge, has a plurality of dispatch workstations, dispatch software, and a notification database access point, and receives the identifying information from the communications bridge. The notification database is accessible by the CCC through the notification database access point and includes data corresponding to a subscriber. The notification database is also accessible by the dispatch software to provide subscriber data corresponding to the identifying information to the CCC through the notification database access point.

In one embodiment of the invention, the CCC includes an emergency care database access point, a CAD bridge, and an emergency care information database. The emergency care information database is accessible by the CCC through the emergency care database access point and includes a medical history, insurance, police, and fire emergency information provided by the subscriber. The emergency care information database is accessible by the dispatch software to provide emergency care information corresponding to the identifying information to the CCC through the emergency care information database access point. The CAD bridge is in communication with the communications bridge receiving the emergency care information from the CCC which makes the emergency care information available at the CAD bridge.

In one embodiment, the CAD bridge uses a plurality of displays which show the emergency care information obtained from the emergency care information database. In another embodiment, the CAD bridge formats the emergency care information to be entered in the PSAP's CAD system automatically.

A further embodiment comprises an emergency field unit bridge receiving the emergency care information from the CCC which makes the emergency care information available at the emergency field unit bridge.

In a still further embodiment, the emergency field unit bridge uses cellular telephone ("wireless"), facsimile, and public data networks for the transmission of the emergency care information to the emergency field units.

BRIEF DESCRIPTION OF THE DRAWINGS

For the purpose of illustrating the invention, there is shown in the drawing a form which is presently preferred; it being understood, however, that this invention is not limited to the precise arrangements and instrumentalities shown.

DESCRIPTION OF THE PREFERRED EMBODIMENT

While the invention is described herein in connection with a preferred embodiment, it is understood that it is not intended to limit the invention to that embodiment. On the contrary, it is intended to cover all alternatives, modifications, and equivalents as may be included within the spirit and scope of the invention as defined by the appended claims.

The present invention is a private notification system designed to communicate 9-1-1 information to a predetermined list of people (such as close family and friends) selected by the system's subscriber. One embodiment of the system can also communicate the 9-1-1 information to public emergency care personnel attending the subscriber and to health care providers of the subscriber. The predetermined list of people as well as the emergency care information from the system's subscriber can be obtained by completing either a paper or an electronic form at the time of subscription. At the same time, the subscriber can provide the emergency care information (including telephone number, address, medical history, medical insurance, fire, and police information). As emergency care information changes (e.g., the medical condition improves, there is a change in the medical insurance carrier, children move away, a burglar alarm is installed, a company-subscriber begins using hazardous materials), the emergency care information is accordingly updated. The information is checked and updated, if necessary, on a regular basis.

Figure 1:
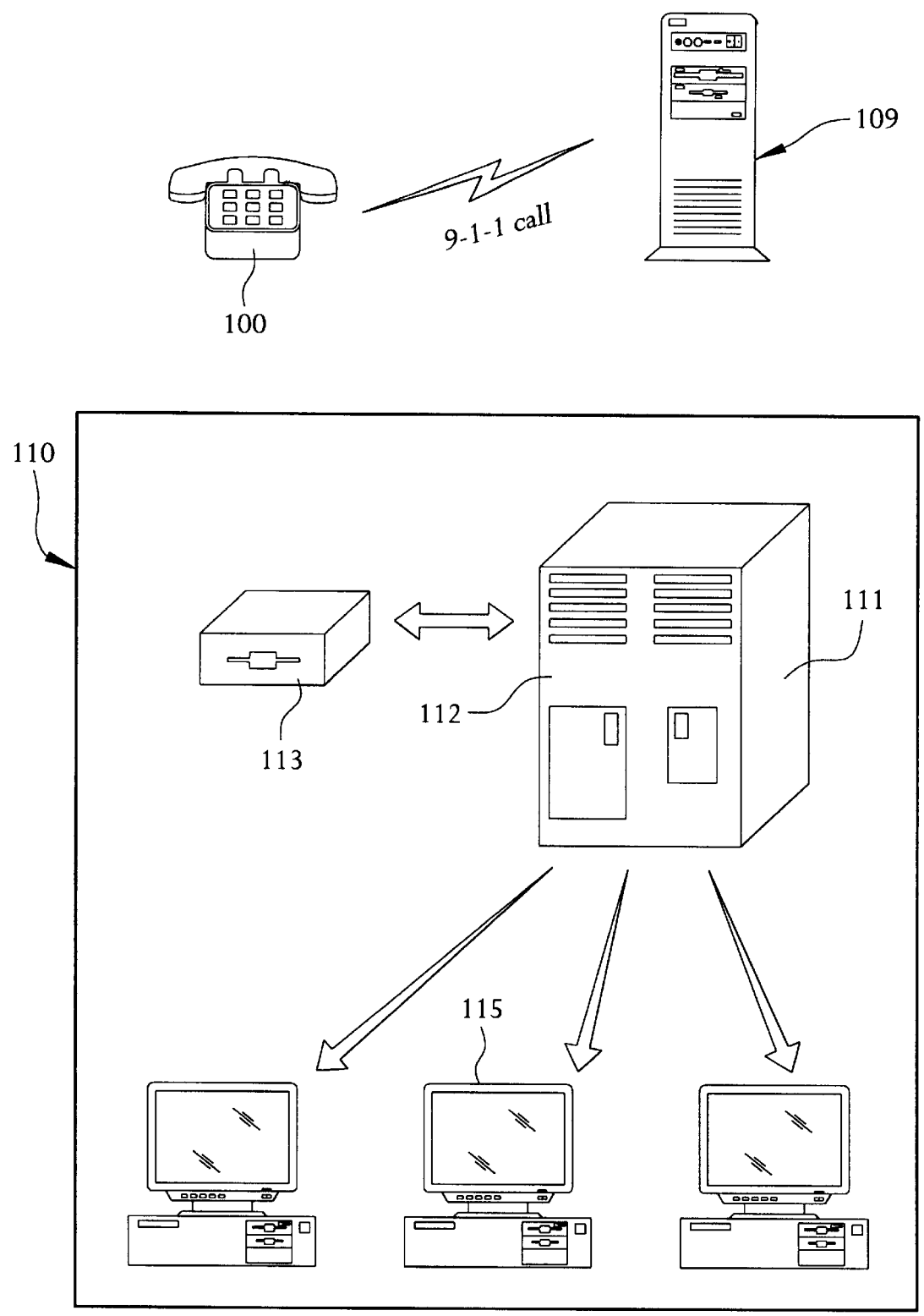
FIG. 1 illustrates a 9-1-1 call as it is processed by the present invention.

FIG. 1 illustrates a 9-1-1 call from a subscriber of the system as embodied in the present invention and the processing of such a call. The system comprises a communications bridge 109, a private Command Control Center ("CCC") 110, and a notification database 113. In the preferred embodiment of the present invention, the communications bridge 109 comprises a personal computer controlled by a communication software application as later described. Although not shown in FIG. 1, the communications bridge 109 contemplated by the present invention includes a device connected to the subscriber's telephone. Such a device might detect that the subscriber placed the 9-1-1 call and then communicate the information about the subscriber, such as his or her telephone number and address ("identifying information"), to the CCC via a satellite, local telephone, cable television, cellular telephone, or any other transmission mode. The communications bridge 109 contemplated by the present invention also includes any device used by a local, long distance, or wireless telephone company which detects that the subscriber placed the 9-1-1 call and then communicates the identifying information to the CCC before the 9-1-1 call is passed on to the public 9-1-1 infrastructure as later described.

Figure 2:
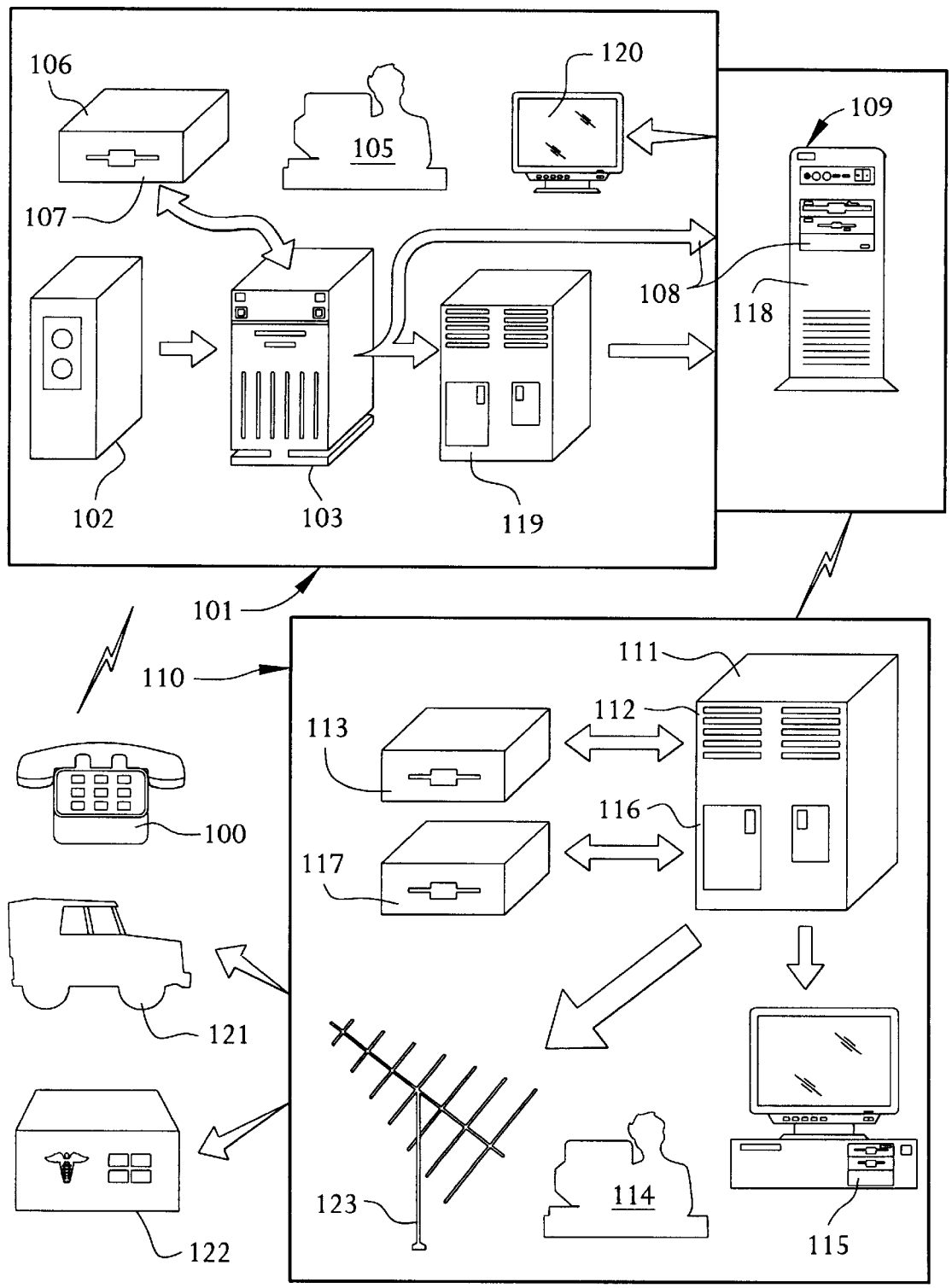
FIG. 2 shows such processing in conjunction with a PSAP and the way in which the present invention further processes the call.

FIG. 2 shows one embodiment of the present invention which works in conjunction with a Public Safety Answering Point ("PSAP"). When a person places a 9-1-1 call from a telephone 100, indicating that (s)he is in distress and requires emergency care, the call is passed through a telephone company central office to the PSAP 101. PSAP is a generic designation used to describe a location where the 9-1-1 telephone call is answered, processed, and the nature of the emergency is determined. After the appropriate determination is made, the phone call is forwarded to the responsible public agency, e.g. police, fire, and/or emergency medical care agency. While many PSAP's include call taking and dispatching operations, the term PSAP is generally defined by service providers as the location where the 9-1-1 telephone calls are terminated. The 9-1-1 calls are delivered to a PSAP with a telephone number (automatic number identification or "ANI", as will be described later) and a service location (automatic location information or "ALI", as will be described later) of a caller. PSAP equipment often includes an ANI/ALI controller, an automatic call distributor or a PBX telephone switch, a recording system, agent console positions, a computer aided dispatch interface, and dedicated power supplies. PSAPs can be differentiated into primary and secondary types, based upon whether the 9-1-1 calls are delivered directly to the PSAP or transferred to it from another public safety agency. A transfer mechanism can be manual, fixed, or selective. Selective transfers speed up notification of dispatching agencies by automatically picking the appropriate agency for the 9-1-1 caller by using the ANI delivered with the call to the PSAP. The present invention works with either transfer mechanism.

At the PSAP 101, the phone call is passed into an Automatic Call Distributor ("ACD") 102 and then to an E-9-1-1 controller 103. The basic function of the ACD is to deliver the E-9-1-1 call to the most available 9-1-1 call operator. The ACD is responsible for queuing calls when no 9-1-1 call operators are available and then routing them to the first available operator. Combined with the ANI/ALI controller, the ACD serves as control equipment for a PSAP telephone system. The ACD is thus responsible for call routing functions, while the ANI/ALI controller synchronizes the presentation of ALI information to 9-1-1 call operators. Many companies manufacture ACDs, ANI/ALI controllers and various hybrids of the two.

The following is a list of vendors who provide either software, hardware, or both:
AT&T Public Safety Systems
CML Technologies, Inc.
Emergitech, Inc.
Exacom, Inc.
Informer Computer Systems, Inc.
Motorola
Plant Equipment, Inc.
Positron Industries
Proctor and Associates Co.
Public Safety Systems, Inc.
Rockwell Telecommunications
SCC Communications Corp.
TCI
Telident, Inc.

The present invention works with systems from any one of the above-noted vendors. The E-9-1-1 controller is a combination of software and hardware which works in conjunction with and performs inquiries on the ANI/ALI database. The ACD 102 and the E-9-1-1 controller 103 work in concert to pass to a 9-1-1 operator 105 the phone call, as well as the caller's telephone number and address obtained through the central office functions of Automatic Number Identification ("ANI") 106 and Automatic Location Information ("ALI") 107, collectively referred to as ANI/ALI data. The Automatic Location Information (ALI) database is the central repository for all telephone service address information in a given service provider area. The area can be as small as a town or county or as large as a city or metropolitan area. The ALI record, transmitted to a PSAP when the 9-1-1 call is processed, contains significant emergency response information. This information is typically customized for the individual caller and comprises a name of a person who subscribes to the telephone service ("service name"), service address and telephone number of the caller. The ALI record also contains pertinent police, fire, and emergency medical service dispatch information. In addition, the record contains useful telephone service provider information such as the class of service (residential, business, coin, PBX, etc.) and the Emergency Service Number ("ESN"). The ANI/ALI databases are created and maintained by telephone companies. They comprise a comprehensive list of telephone numbers and their service or billing locations. The data contained in those databases is provided to the public safety agencies responding to the E-9-1-1 call. The data can also be used to allow agencies to respond to calls where the caller is unable to provide their location to the E-9-1-1 operator. The ANI/ALI data serves as identifying information as to the 9-1-1 caller.

The PSAP notification bridge 108 obtains the ANI/ALI data through a serial port (and/or a connected "Y" cable) located on the E-9-1-1 controller 103. The connection to the E-9-1-1 controller is made via an RS-232 serial cable. The E-9-1-1 controller uses an asynchronous communication protocol. Data streams are normally ASCII format but their format is determined by the telephone company maintaining the ANI/ALI databases. The most common format comprises fixed length fields within a record, normally with carriage return (CR -0D hex) characters marking the end of the field. Some formats include a line feed (LF -0A hex) character after the CR. A record is normally delimited by a start-of-text (STX—02 hex) character at the beginning and end-of-text (ETX—03 hex) character at the end. Additionally, each record is normally followed by a block check character (BCC) which is used to validate the correctness of the data transmission. The data format provided by Mountain Bell is as follows:

| Mountain Bell Node Format | | |
|---|---|---|
| Character | Length | Comment |
| 1 | 1 | ASCII STX # |
| 2 | 1 | Link status (1,2, or 9) |
| 3 | 2 | Attendant (01 to 15) |
| 5 | 1 | ASCII c/r # |
| 6 | 1 | ASCII (# |
| 7 | 3 | NPA |
| 10 | 1 | ASCII) # |
| 11 | 1 | ASCII Space # |
| 12 | 3 | NXX |
| 15 | 1 | ASCII - # |
| 16 | 4 | Tel. No. |
| 20 | 1 | ASCII Space # |
| 21 | 4 | Class of Service _ |
| 25 | 1 | ASCII Spacr # |
| 26 | 2 | Date (MO) |
| 28 | 1 | ASCII / # |
| 29 | 2 | Date (DAY) |
| 31 | 1 | ASCII Space # |
| 32 | 2 | Time (HR) |
| 34 | 1 | ASCII : # |
| 35 | 2 | Time (Min) |
| 37 | 1 | ASCII C/R # |
| 38 | 28 | Cust. Name |
| 66 | 1 | ASCII C/R # |
| 67 | 8 | House Number |
| 75 | 1 | ASCII Space |
| 76 | 4 | House Number Suffix |
| 80 | 1 | ASCII c/r # |
| 81 | 2 | Direction |
| 83 | 1 | ASCII Space # |
| 84 | 28 | Street Name |

-continued

Mountain Bell Node Format

| Character | Length | Comment |
| --- | --- | --- |
| 112 | 1 | ASCII c/r # |
| 113 | 15 | Street Name Cont. |
| 128 | 2 | Psap Id |
| 130 | 3 | ESN |
| 133 | 1 | ASCII Space # |
| 134 | 1 | ASCII P # |
| 135 | 1 | ASCII ## |
| 136 | 3 | Pilot NXX |
| 139 | 1 | ASCII - # |
| 140 | 4 | Pilot TN |
| 144 | 1 | ASCII c/r # |
| 145 | 20 | Location Field |
| 165 | 1 | ASCII c/r # |
| 166 | 2 | State |
| 168 | 1 | ASCII Space # |
| 169 | 28 | City |
| 197 | 1 | ASCII c/r # |
| 198 | 15 | Free Field |
| 213 | 1 | ASCII c/r # |
| 214 | 1 | ASCII p # |
| 215 | 1 | ASCII S |
| 216 | 1 | ASCII A # |
| 217 | 1 | ASCII P # |
| 218 | 1 | ASCII - # |
| 219 | 70** | Police, Fire, Amb. ** |
| 2XX | 1 | ASCII c/r # |
| 2XX | 1 | ASCII etx # |
| 2XX | 1 | Block Check Character |

Note # at end of line denotes fixed character in data stream
**Field maximum size is seventy characters. For each ASCII (C/R) character an additional ASCII (LF) character is added. This additional ASCII (LF) character does not count toward the seventy character limit.

The PSAP notification bridge also obtains an original answering location corresponding to the logical address of the 9-1-1 operator 105 handling a particular call from the E-9-1-1 controller. Thus, if there are twenty operators logically numbered 1–20 and operator 5 takes the 9-1-1 call, the logical operator address 5 comprises the original answering location.

If the subscriber is not located at the given ALI address when the emergency occurs, the 9-1-1 caller may notify the 9-1-1 operator 105 that the emergency involves a subscriber to the system and may provide to the 9-1-1 operator the subscriber's telephone number. The telephone number might be on a card identifying the subscriber as a subscriber to the system, where his or her account number is also the telephone number maintained by the system. Upon such notification, the 9-1-1 operator 105 enters the subscriber's telephone number into a predetermined field in the E-9-1-1 controller data record (see,e.g., telephone number field No. 16, in the Mountain Bell Node Format table).

The PSAP notification bridge 108 is in communication with the communications bridge 109. The PSAP notification bridge 108 and the communications bridge 109 are components of a single communication software application. Interprocess communications ("IPC") is used to pass messages between these two bridges. Depending on the version of the compiled communication software application, the IPC might take the form of object-to-object message passing or simple procedure calls. The PSAP notification bridge 108 then passes the ANI/ALI data to the communications bridge 109. The PSAP notification bridge 108 also passes the original answering location to the communications bridge 109 which stores it for later processing. The communications bridge 109 in turn passes the ANI data to the CCC 110. The location information is obtained from the notification database 113 as will be described later.

One hardware platform of the present invention is an Intel based personal computer ("PC"), running under the Microsoft Windows operating environment. The communication application software may be deployed independent of the operating environment, e.g., it can run under a Unix operating system, such as IBM's AIX operating system.

The CCC is in communication with the communications bridge. The CCC communicates with the communications bridge via a dial-up telephone line utilizing asynchronous modem communications. The system is capable of operating through a dedicated leased line configuration and is capable of supporting TCP/IP communication between the CCC and PSAP. The CCC 110 then deploys the dispatch software 111 and the notification database access point 112 to search the notification database 113 using the ANI data to determine whether the 9-1-1 call was placed by a subscriber.

The search produces two possible results. In one case, if the search determines the 9-1-1 call as not originating from a subscriber, the system takes no further action respecting the call. Of course, this does not affect the regular processing of the 9-1-1 call at the PSAP by the 9-1-1 operator 105 who first receives the 9-1-1 call.

One of the benefits of the present invention is that it allows for the private communication of 9-1-1 information to operate in parallel with the public safety access points and the associated personnel. Thus, the system which embodies the present invention works in conjunction with and as a supplement to the public emergency system already in place. Such an arrangement provides an additional benefit by conserving the scarce public emergency care resources.

In the other case, if the search determines the 9-1-1 call as being originated by a subscriber, the dispatch software 111 notifies the CCC 110 call processing personnel 114, using the dispatch workstation 115, that a subscriber placed a 9-1-1 call. It also provides the subscriber's preselected list of close family and friends which the subscriber wished be notified during an emergency. The CCC 110 then notifies the people listed on the preselected list of the emergency.

The dispatch software 111 then uses the ANI/ALI data via the emergency care information access point 116 to retrieve the emergency care information of the subscriber from the emergency care information database 117. The retrieved emergency care information is furnished to the CCC 110 call processing personnel 114 using the dispatch workstation 115. The retrieved emergency care information is also routed to the CAD bridge 118 through the communications bridge 109. The CAD bridge 118 is in communication with the communications bridge 109. The CAD bridge and the communications bridge are components of a single software application. The IPC is used to pass messages between these two bridges. Depending on the version of the compiled software, the IPC might take a form of object-to-object message passing or simple procedure calls. Once received at the CAD bridge 118, the original answering location obtained from the E-9-1-1 controller 103 and stored within the communications bridge 109 is used to route the emergency care information via the CAD bridge 118 to the location of the 9-1-1 operator 105 who first received the 9-1-1 call.

If the PSAP 101 is equipped with a Computer Aided Dispatch ("CAD") 119 system, the subscriber's emergency care information can be received directly into the CAD system 119 via the CAD bridge 118 and an application program interface for the CAD system 119. The CAD system is a tool used by many public emergency care agencies to keep track of incidents and emergency care units. Once the 9-1-1 call is received by a public safety agency equipped with a CAD system, the location and type of incident are entered into the system. The system then forwards this information to the appropriate dispatcher. The dispatcher receives the information which the 9-1-1 call operator entered into the system, including the ANI/ALI data. The CAD system normally makes a recommendation to the dispatcher for the appropriate unit(s) to dispatch. A robust CAD system includes many mechanisms for communicating directly via a mobile data network.

Several major providers exist in the CAD market including SHL, PRC, Tiburon, PSSI and Intergraph. The present invention defines an application program interface ("API") specification which CAD providers can use to interface with the present invention. This API is of a bi-directional nature. That is, it both provides information to and receives information from the CCC 110. The information received, other than protocol and handshaking information, is the subscriber's emergency care information. The information sent, other than protocol and handshaking information, is information about the public emergency care personnel units 121 responding to the call. A simple asynchronous acknowledge/negative acknowledge (ACK/NAK) protocol is used to underlay the API.

The following table describes the messages that the CAD system may receive from CCC and their intended purpose.

| Message | Contents | Purpose |
| --- | --- | --- |
| Emergency care information | Answering Position # Telephone # History | This message allows the CAD system to display the subscriber emergency care information at the original answering location of the 9-1-1 operator. Additionally, the CAD system can preserve the subscriber's emergency care information and pass it to the appropriate dispatcher who can, in turn pass it to the field unit(s). This message also notifies the CAD system that the CCC will have an ongoing interest in any further information (such as incident details, etc) created for this call; |
| Notification Interest | Answering Position # Telephone # | This message informs the CAD system that the CCC will have an ongoing interest in any incident created for this call. |

The following table describes the messages that the CAD system may send and their intended purpose.

| Message | Contents | Purpose |
| --- | --- | --- |
| Unit(s) Responding | Telephone # Unit 1 Unit 2 (optional) Unit 3 (optional) Unit 4 (optional) | This message provides the CCC with the identifier(s) of the unit(s) responding to a subscriber such that the CCC may transmit the subscriber's emergency care information directly to the unit via the emergency field unit bridge 123 as will be described later. |
| Transport Location | Telephone # Transport Location | This message provides the CCC with the information referring to the destination medical treatment facility 122 as will be described later. |

The API uses the following general message conventions. All messages to or from the CCC, with the exception of ACK/NAK messages are in the following format:

\<STX\>\<message\>\<ETX\>\<BCC\>

Where:

STX—Start of text (02 hex)

ETX—End of text (03 hex)

Message—One of the messages outlined above, or a heartbeat message as described below.

BCC—Block Check Character. This character is obtained by summing the continuous "Exclusive Or" of all preceding characters, excluding the STX. The BCC may have a value of 0 to 255 hex.

All fields within a message will be separated by a carriage return (CR—OD hex).

The API uses the following handshaking protocol. A heartbeat mechanism continually ensures the validity of the link between CAD 119 and the CCC 110. Thus, after one minute of inactivity from both sides, the CCC 110 sends a heartbeat message to the CAD 119 via the CAD bridge 118. The heartbeat is formatted as follows:

\<STX\>'H'\<ETX\>\<BCC\>

Where:

H—ASCII character 'H' (48 hex)

Figure 3:
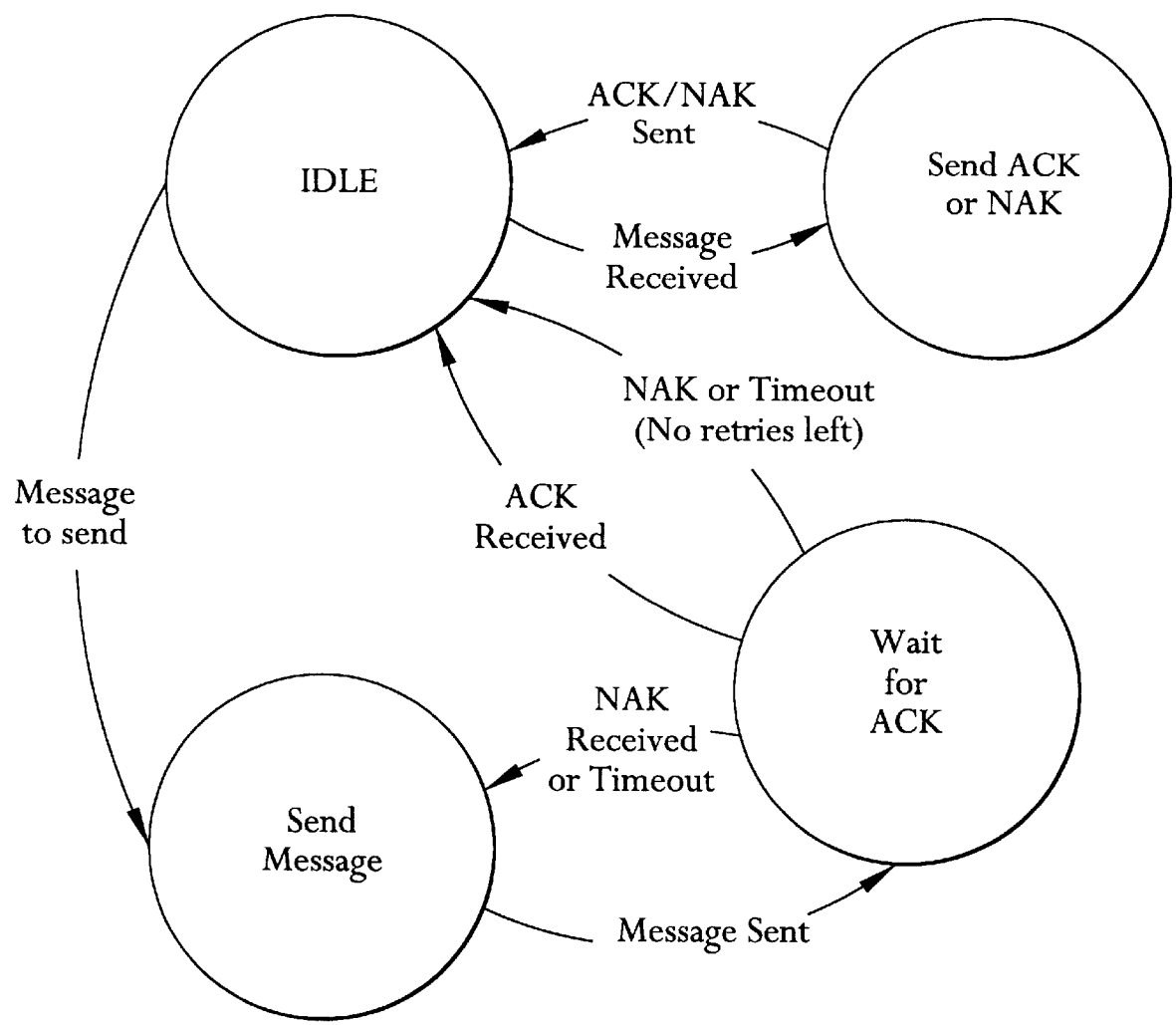
FIG. 3 illustrates a state diagram of a CAD/CCC interaction.

As with all messages, the CAD system responds with an ACK (06 hex) or a NAK (07 hex) responding to the receipt of this message. This ACK or NAK must be sent within 5 second of message receipt or an error will be assumed and the message will be resent. The state diagram shown in FIG. 3 reflects this protocol.

The CAD products run on many different platforms and operating systems. The present invention provides support for serial platforms and operating systems. It also supports serial asynchronous communication and is capable of working in a TCP/IP communication environment. If the PSAP 101 is not equipped with a CAD system 119, the subscriber's emergency care information can be received via the CAD bridge 118 into stand alone displays 120 at the original answering location of the 9-1-1 operator 105.

In the preferred embodiment, the CAD bridge 118 is set up to receive notification from the CCC 110 as to the presence of emergency care information for a subscriber. After the CAD bridge 118 receives and routes the emergency care information to the original answering location of the 9-1-1 operator 105 as noted above, the CAD bridge 118 obtains from the CAD system 119 the public emergency unit identification information comprising which public emergency care personnel unit(s) 121 is(are) responding to the 9-1-1 call 100. In the preferred embodiment, the public emergency unit identification information comprises a wireless telephone number used to contact the public emergency care personnel unit(s) 121. The CAD bridge 118 then passes the public emergency unit identification information to the CCC 110 via the communications bridge 109. The CCC 110 then passes the emergency care information of the 9-1-1 caller receiving emergency care to the public emergency care personnel unit 121 en route to the scene of the emergency via the emergency field unit bridge 123.

In the preferred embodiment, the emergency field unit bridge 123 comprises any presently existing mobile data terminal. The emergency field unit bridge 123 also includes a hand-held facsimile unit, such as that made by Reflection Technology under the brand name FaxView.

After the public emergency care personnel unit 121 visits the site of the emergency and begins transporting the 9-1-1 caller to the medical treatment facility 122 for emergency treatment, medical facility information becomes available at the CAD system 119. Most CAD systems allow for the entry of a transport location for medical service units. This happens either via the dispatcher entry based on radio communication with the unit or, if so equipped, via a mobile data communication device from the field. The CAD system then formats and forwards the information via the API to the communications bridge 109 which in turn passes it to the CCC 110. The medical facility information comprises name, address, and telephone and facsimile numbers of the facility. The CAD bridge 118 obtains the medical facility information from the CAD system 119 and then passes this information to the CCC 110 via the communications bridge 109. The CCC 110 in turn communicates the emergency care information of the 9-1-1 caller to the medical treatment facility 122 to which the 9-1-1 caller is being transported. In the preferred embodiment, the CCC 110 communicates the 9-1-1 caller's emergency care information to the destination medical treatment facility 122 via facsimile. The CCC 110 then notifies the persons listed as preselected recipients of the destination medical treatment facility 122.

It is understood that one of the advantages of the present invention is its ability to communicate emergency care information in real time to the extent such emergency care information is available to the public emergency care personnel and the CCC.

The present invention may be embodied in other specific forms without departing from the spirit or essential attributes thereof and, accordingly, reference should be made to the appended claims, rather than to the foregoing specification, as indicating the scope of the invention.

We claim:

1. A private notification system for communicating 911 information to preselected recipients by a subscriber to the system comprising:

(a) a public safety answering point notification bridge separate from a 911 trunk and operating in conjunction with a public safety answering point having an E-911 controller, said PSAP notification bridge in communication with the public safety answering point and which obtains the identifying information from the E-911 controller of the public safety answering point receiving the 911 call;

(b) a communications bridge in communication with said public safety answering point notification bridge and receiving identifying information from at least one of an ANI and ALI database respecting a person placing a 911 call from the public safety answering point notification bridge;

(c) a private command control center in communication with said communications bridge, said private command control center having a plurality of dispatch workstations, dispatch software, and a notification database access point, said private command control center receiving the identifying information from said communications bridge; and (d) a notification database separate from said ANI and ALI databases accessible by said command control center through the notification database access point, the database including data corresponding to at least one subscriber, the database being accessible by the dispatch software to provide subscriber data corresponding to the identifying information to said private command control center through the notification database access point.

2. The private notification system as in claim 1, wherein said private command control center includes an emergency care database access point, the private notification system further comprising:

(e) an emergency care information database accessible by said command control center through the emergency care database access point, the database including emergency care information of the subscriber, the database being accessible by the dispatch software to provide the emergency care information corresponding to the identifying information to said private command control center through the emergency care information database access point; and (f) a computer aided dispatch bridge in communication with said communications bridge, said communications bridge receiving the emergency care information from said private command control center and transmitting the emergency care information to said computer aided dispatch bridge.

3. The private notification system of claim 2 wherein said computer aided dispatch bridge includes a human-readable display located at the public safety answering point.

4. The private notification system of claim 3 wherein said computer aided dispatch bridge includes an application program interface to a computer aided dispatch system.

5. The private notification system of claim 2 further comprising an emergency field unit bridge, said emergency field unit bridge receiving the emergency care information from said private command control center and making the emergency care information available to an emergency field unit.

6. The private notification system of claim 5 wherein said emergency field unit bridge includes hand held communications devices.

7. The private notification system of claim 6 wherein said hand-held communications device is a hand-held facsimile unit.

8. The private notification system of claim 5 wherein said emergency field unit bridge includes a wireless telephone network.

9. A method for communicating 911 information through a private notification system separate from a 911 trunk, said private notification system operating in conjunction with a public safety answering point having an E-911 controller, the method comprising the steps of:

(a) storing data corresponding to a subscriber to the private notification system in a notification database separate from ANI and ALI databases;

(b) obtaining identifying information from at least one of an ANI and ALI database respecting a person placing a 911 call from the E-911 controller of the public safety answering point receiving the 911 call through a public safety answering point notification bridge;

(c) communicating the identifying information from the public safety answering point notification bridge to a communications bridge in communication with said public safety answering point notification bridge;

(d) conmmunicating the identifying information from said communications bridge to a private command control center, said private command control center having a plurality of dispatch workstations, dispatch software, and an emergency care information database access point in communication with said communications bridge;

(e) searching the notification database using the notification database access point and the identifying information to determine whether the 911 call was placed by a subscriber to the private notification system;

(e) if the 911 call was placed by a subscriber, identifying the subscriber based on the identifying information and retrieving the data stored in the notification database corresponding to the subscriber; and (f) notifying persons identified as preselected recipients of the emergency.

10. The method as defined in claim 9 further comprising the steps of:
   (g) storing emergency care information provided by the subscriber to the private notification system into an emergency care information database;
   (h) searching the emergency care information database using the emergency care information access point and the identifying information and retrieving the emergency care information;
   (i) communicating the emergency care information to the plurality of dispatch workstations and to a computer aided dispatch bridge via the communications bridge;
   (j) routing the emergency care information to an emergency operator answering the 9-1-1 call at the public safety access point; and
   (k) presenting the emergency care information to the emergency operator answering the 9-1-1 call.

11. The method as defined in claim 10 wherein the emergency care information communicated to the computer aided dispatch bridge is displayed in human-readable form at the public safety answering point.

12. The method as defined in claim 10 wherein the emergency care information is communicated to the computer aided dispatch system via an application program interface in communication with the computer aided dispatch system and the computer aided dispatch bridge.

13. The method as defined in claim 12 wherein the emergency care information communicated to the computer aided dispatch bridge is displayed in human-readable form at the public safety answering point.

14. The method as defined in claim 10 further comprising the steps of:
   (l) obtaining public emergency care personnel information from the computer aided dispatch system;
   (m) communicating the public emergency care personnel information to the private command control center via the communications bridge; and
   (n) communicating the emergency care information to an emergency field unit bridge using the public emergency care personnel information.

15. The method as defined in claim 14 wherein the emergency care information is communicated via hand-held communications devices.

16. The method as defined in claim 15 wherein the emergency care information is communicated via a hand-held facsimile unit.

17. The method as defined in claim 14 wherein the emergency care information is communicated over a wireless telephone network.

18. The method as defined in claim 10 further comprising the steps of:
   (l) obtaining medical facility information from the computer aided dispatch system;
   (m) communicating the medical facility information to the private command control center via the communications bridge; and
   (n) communicating the emergency care information to a medical treatment facility.

19. The method as defined in claim 18 further comprising the step of notifying the preselected recipients of the medical facility information.

20. The method as defined in claim 14 further comprising the steps of:
   (l) obtaining medical facility information from the computer aided dispatch system;
   (m) communicating the medical facility information to the private command control center via the communications bridge; and
   (n) communicating the emergency care information to a medical treatment facility using the medical facility information.

21. The method as defined in claim 20 further comprising the step of notifying the preselected recipients of the medical facility information.

22. The private notification system of claim 2, wherein said computer aided dispatch bridge routes the emergency care information to the 9-1-1 operator answering the 9-1-1 call.

23. The method as defined in claim 10 further comprising the steps of:
   (l) obtaining medical facility information from the computer aided dispatch system;
   (m) communicating the medical facility information to the private command control center via the communications bridge; and
   (n) notifying the preselected recipients of the medical facility information.

* * * * *